United States Patent [19]

Akaiwa

[11] Patent Number: 4,882,766
[45] Date of Patent: Nov. 21, 1989

[54] TERMINAL STATION OF A RADIO COMMUNICATION NETWORK CAPABLE OF EFFECTIVELY USING RADIO CHANNELS ASSIGNED TO THE NETWORK

[75] Inventor: Yoshihiko Akaiwa, Tokyo, Japan

[73] Assignee: NEC Corporation, Tokyo, Japan

[21] Appl. No.: 89,102

[22] Filed: Aug. 25, 1987

[30] Foreign Application Priority Data

Aug. 25, 1986 [JP] Japan .................................. 61-198706

[51] Int. Cl.4 .............................................. H04B 7/00
[52] U.S. Cl. ...................................... 455/58; 455/56; 455/53; 455/67; 379/62
[58] Field of Search ...................... 455/54, 58, 53, 56, 455/33, 49, 67; 379/59, 62

[56] References Cited

U.S. PATENT DOCUMENTS

| | | | |
|---|---|---|---|
| 3,913,017 | 10/1975 | Imaseki | 455/54 |
| 4,056,779 | 11/1977 | Toler | 455/58 X |
| 4,096,440 | 6/1978 | Okasaka | 455/33 |
| 4,131,849 | 12/1978 | Freeburg et al. | 455/58 X |
| 4,166,927 | 9/1979 | Hamaoki | 379/59 |
| 4,409,687 | 10/1983 | Berti et al. | 455/54 X |
| 4,608,711 | 8/1986 | Goldman | 455/33 |

FOREIGN PATENT DOCUMENTS 0047344 3/1983 Japan .................................. 455/54
0811224 4/1959 United Kingdom ................ 455/58

Primary Examiner—Robert L. Griffin
Assistant Examiner—Ralph E. Smith
Attorney, Agent, or Firm—Sughrue, Mion, Zinn, Macpeak, and Seas

[57] ABSTRACT

For use in a common service area of a plurality of radio base stations, each being preassigned with a radio channel and for transmitting a channel status signal indicative of whether the radio channel is idle or busy, a terminal station (14) comprises a monitoring circuit (37) for cyclically monitoring the channel status signals of the respective base stations to produce an internal signal when the radio channel is found idle for one of the base stations that has a highest priority for the terminal status. Responsive to the internal signal, a control circuit (29) inhibits the cyclic monitoring for other base station or stations. The priority is decided by a measuring circuit (27) for measuring field intensities of the respective channel status signals. When the base stations are three in number, operation of the monitoring circuit is inhibited for the channel status signal of a lowest-priority base station when both radio channels of two other base stations are idle.

7 Claims, 7 Drawing Sheets

TERMINAL STATION OF A RADIO COMMUNICATION NETWORK CAPABLE OF EFFECTIVELY USING RADIO CHANNELS ASSIGNED TO THE NETWORK

BACKGROUND OF THE INVENTION

This invention relates to a terminal station for use in a radio communication network, such as a cordless telephone system, including a plurality of base stations which have service areas partially overlapping on one another.

A conventional cordless telephone system comprises a plurality of base stations and a plurality of terminal stations. The base stations have service areas partially overlapping on one another. The terminal stations are placed in the service areas. Different radio channels are preassigned to the base stations for communication with the terminal stations. Therefore, the base stations are communicable with the terminal stations through preassigned ones of the radio channels.

Generally, the conventional cordless telephone system is designed so that the base stations are preassigned with a predetermined number of the radio channels for a greater number of the terminal stations. For example, one radio channel is assigned to each base station. The greater number may be equal to two. In the conventional cordless telephone, the radio channel becomes busy for a predetermined one of the base stations when communication is carried out by one of terminal stations that is preassigned to the base station under consideration. In this event, it is impossible, even if the radio channel of another base station is idle, that another terminal station communicates through the radio channel of the other base station. As a result, the conventional cordless telephone system is disadvantageous in that the radio channels are not effectively used by the terminal stations.

SUMMARY OF THE INVENTION

It is therefore an object of the present invention to provide a terminal station of a radio communication network having service areas partially overlapped with one another, which effectively uses radio channels assigned to the network.

Other object of this invention will become clear as the description proceeds.

According to an aspect of this invention, there is provided a terminal station which is for use in a common service area of a plurality of radio base stations comprising a main base station and a supplementary base station having a lower priority for the terminal station than the main base stations. Each base station is preassigned with a radio channel and for transmitting a channel status signal representative of whether the radio channel is idle or busy. The terminal station comprises first monitoring means for monitoring the channel status signal of the main base station to produce an internal signal when the radio channel of the main base station is idle, second monitoring means for monitoring the channel status signal of the supplementary base station, and inhibiting means coupled to the first and the second monitoring means and responsive to the internal signal for inhibiting operation of the monitoring means while the radio channel of the main base station is idle.

According to another aspect of this invention, there is provided a terminal station which is for use in a radio communication network. The radio communication network includes a plurality of base stations which have service areas partially overlapping on one another and to which different radio channels are preassigned for communication in the respective service areas. The base stations are for broadcasting channel status signals representative of whether the respective radio channels are idle or busy. The terminal station is communicable with first and second ones of the base stations that have, in relation to the terminal station, a predetermined degree of priority and a lesser degree of priority lower than the predetermined degree, respectively, and that have first and second ones of the radio channels, respectively. The terminal station comprises idle channel monitoring means for monitoring the channel status signals of the first and the second radio channels to detect whether or not each of the first and the second radio channels is idle, and selecting means coupled to the idle channel monitoring means for selecting either of the first and the second radio channels with reference to the predetermined and the lesser degrees of priority when at least one of the first and the second radio channels is idle.

DESCRIPTION OF THE PREFERRED EMBODIMENTS

Figure 1:
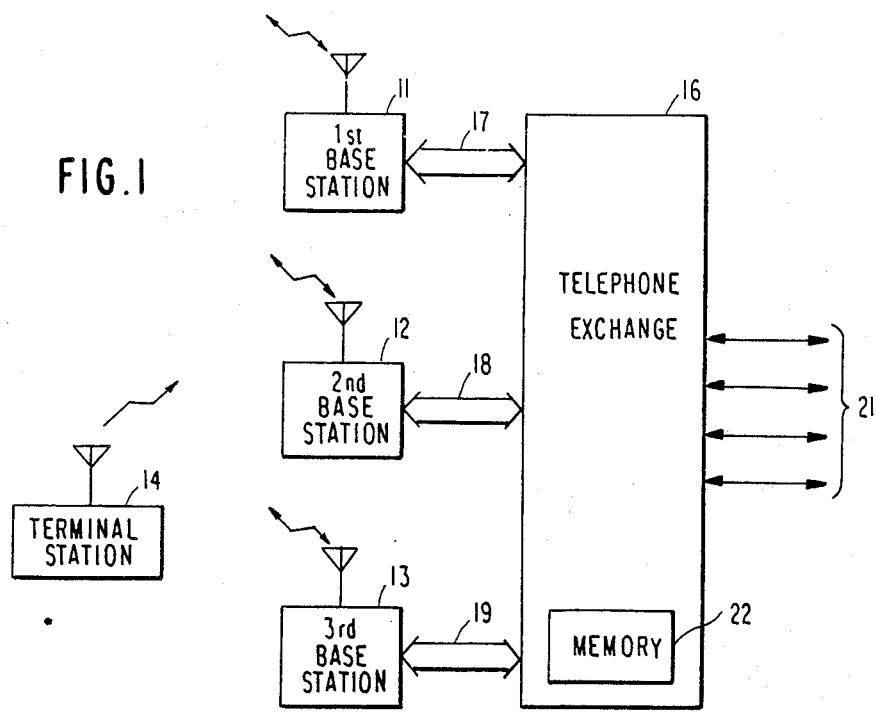
FIG. 1 shows, together with an exchange and a plurality of base stations, a block diagram of a cordless telephone system which comprises a terminal station according to an embodiment of this invention.

Referring to FIG. 1, a cordless telephone system will be described as an example of a radio communication system which comprises a terminal station according to the present invention. The cordless telephone system comprises a plurality of base stations, each at a fixed location. The base stations have service areas partially overlapping on one another. In the example being illustrated, first through third base stations 11, 12, and 13 have service areas which share a common service area.

The cordless telephone system generally comprises a plurality of cordless telephone sets which are for use by subscribers and identified by identification numbers. It will be assumed that the terminal station is one of the cordless telephone sets, depicted at 14, and is in the common service area.

The cordless telephone system further comprises a telephone exchange 16, such as a private branch exchange, coupled to the respective base stations 11, 12, and 13 through subscriber lines 17, 18, and 19 to control operation of the base stations 11 through 13 in the manner known in the art. The telephone exchange 16 is coupled to another telephone exchange (not shown) through line wires 21 and includes a memory 22 which will be described far later in the description.

Each of the base stations 11 through 13 includes a transmitter-receiver (not shown) for transmitting a down-link radio frequency signal to the terminal station 14 and receiving an up-link radio frequency signal from the terminal station 14. Different radio and control channels are preassigned to the respective base stations 11 to 13. The down-link radio frequency signals of the first through the third base stations 11 to 13 reach the terminal station 14 with electric field intensities which may be different.

In a cordless telephone system according to a preferred embodiment of this invention, the terminal station 14 measures the electric field intensities of the respective down-link frequency signals arriving thereat and assigns priorities to the respective base stations 11 through 13. When the terminal station 14 is at a certain point of the common service area, the priority is the highest for the base station whose down-link radio frequency signal reaches the terminal station 14 with the strongest electric field intensity. The base station may be called a main base station. The priority is next to the highest when the down-link radio frequency signal reaches the terminal station 14 with the electric field intensity next to the strongest. The base station may be called a supplementary base station. The priority is the lowest for the base station whose down-link radio frequency signal reaches the terminal station 14 with the weakest electric field intensity. The base station may be called an additional base station.

Attention will be directed to one of the base stations. The down-link radio frequency signal comprises a down-link communication and a control signal transmitted through the radio and the control channels preassigned to the base station under consideration. The down-link communication signal is for carrying an ordinary voice signal which results from one of the subscribers and should be received by the subscriber of the terminal station 14. The control signal includes a discriminating and a channel status signal. The discriminating signal is for discriminating the base station in question from the other base stations. The channel status signal is representative of whether the radio channel is idle or busy.

The up-link radio frequency signal comprises an up-link communication and an instruction signal. The up-link communication signal is for carrying an ordinary voice signal which results from the subscriber of the terminal station 14. The instruction signal is for carrying a priority instruction which will presently be described.

Figure 2:
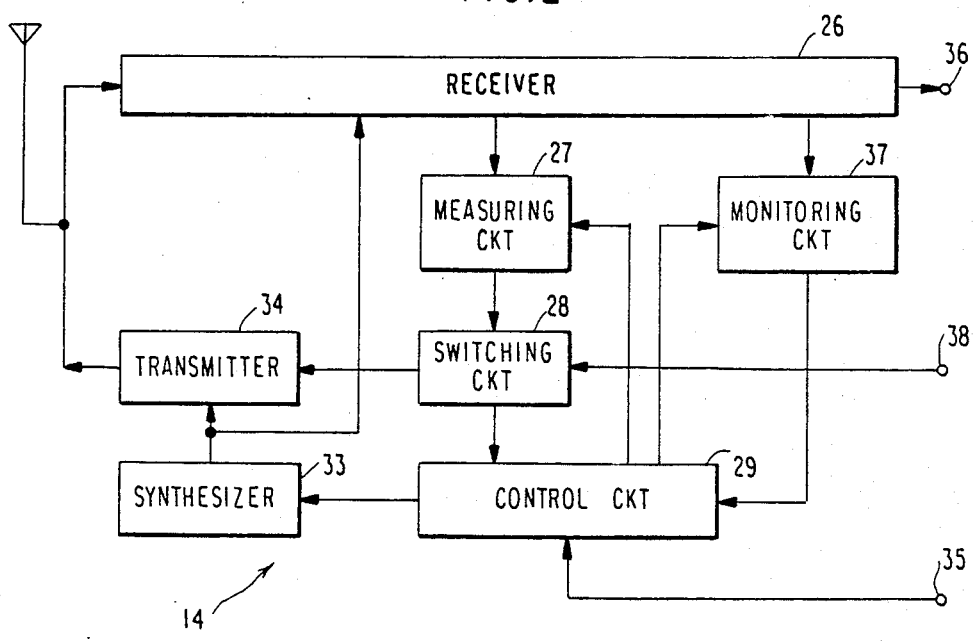
FIG. 2 is a block diagram of the terminal station illustrated in FIG. 1.

Referring to FIG. 2, the terminal station 14 comprises a receiver 26, a measuring circuit 27, a switching circuit 28, a control circuit 29, a synthesizer 33, and a transmitter 34. The receiver 26 is for receiving the down-link radio frequency signal to produce a reception signal representative of the electric field intensity which is dependent on the down-link radio frequency signal reaching the terminal station 14. Responsive to the reception signal, the measuring circuit 27 measures the electric field intensity to produce a first result signal which is supplied to the control circuit 29 through the switching circuit 28. The control circuit 29 is supplied with a reset signal through a reset terminal 35 for resetting the terminal station 14.

Responsive to the first result and the reset signals, the control circuit 29 produces a local instruction signal. Responsive to the local instruction signal, the synthesizer 33 produces a synthesized instruction signal which is supplied to each of the receiver 26 and the transmitter 34. The synthesized instruction signal is transmitted through the transmitter 34 as the instruction signal of the up-link radio frequency signal. A combination of the control circuit 29 and the synthesizer 33 may be referred to herein as a producing arrangement.

Responsive to the down-link communication signal, the receiver 26 sends an audio output signal to an output terminal 36.

The terminal station 14 further comprises a monitoring circuit 37 which is coupled to the receiver 26 to receive the channel status signal. The monitoring circuit 37 is for monitoring the channel status signal to produce a second result signal representative of whether the radio channel is idle or busy. The second result signal is supplied to the control circuit 29. Supplied with the second result signal, the control circuit 29 produces a control signal which is for use in controlling operation of the measuring and the monitoring circuits 27 and 37 as will later be clear.

An input terminal 38 is supplied with an audio input signal related to the ordinary voice signal. The audio input signal is transmitted through the switching circuit 28 and the transmitter 34 as the communication signal of the up-link radio frequency signal.

Figure 3:
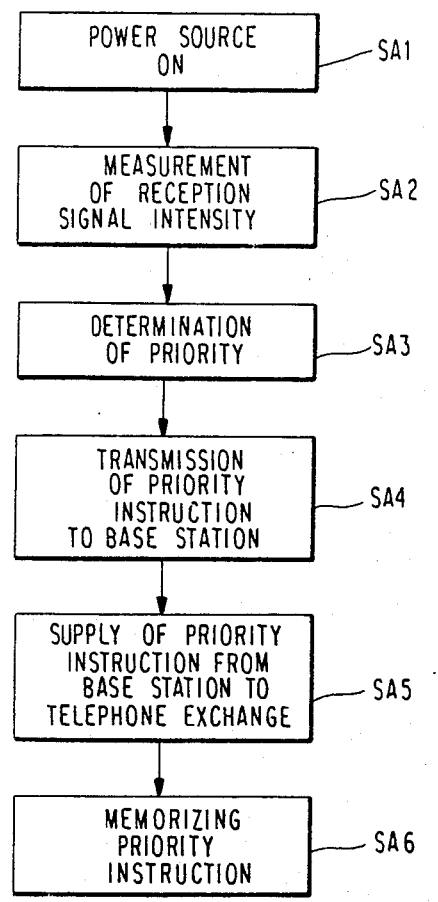
FIG. 3 is a flow chart for use in describing steps of putting the terminal station into operation.

Referring to FIG. 3 in addition to FIGS. 1 and 2, description will be made in relation to steps of assigning the priorities to the base stations. The terminal station 14 includes a power source switch (not shown). At a first stage SA1, the power source switch is turned on. In response, the reset signal is supplied to the reset terminal 35. The first stage SA1 proceeds to a second stage SA2 at which the measuring circuit 27 measures the intensity of the reception signal received from each of the base stations 11 through 13 to produce the first result signal. Namely, the measuring circuit 27 detects a degree of intensity of each of the channel status signals and may therefore be referred to as a first and a second detecting arrangements when used for the channel status signal of the main base station and for the channel status signal of the supplementary base station, respectively.

The second stage SA2 is followed by a third stage SA3 at which the control circuit 29 determines the priorities of the base stations 11 through 13 with reference to the first result signal to produce the local instruction signal with reference to the priority. The control circuit 29 may be referred to herein as a determining and a local producing arrangement.

The third stage SA3 is followed by a fourth stage SA4 at which the terminal station 14 transmits, in addition to the instruction signal dependent on the local instruction signal, an identification signal representative of the identification number preassigned to the terminal station 14. The fourth stage SA4 is followed by a fifth stage SA5 at which the identification and the instruction signals are sent to telephone exchange 16 through one of the base stations. The fifth stage SA5 is followed by a sixth stage SA6 at which the priority instruction and the identification number are memorized in the memory 22. A combination of the transmitter 34 and the base stations may be referred to herein as a supplying arrangement.

Figure 4A:
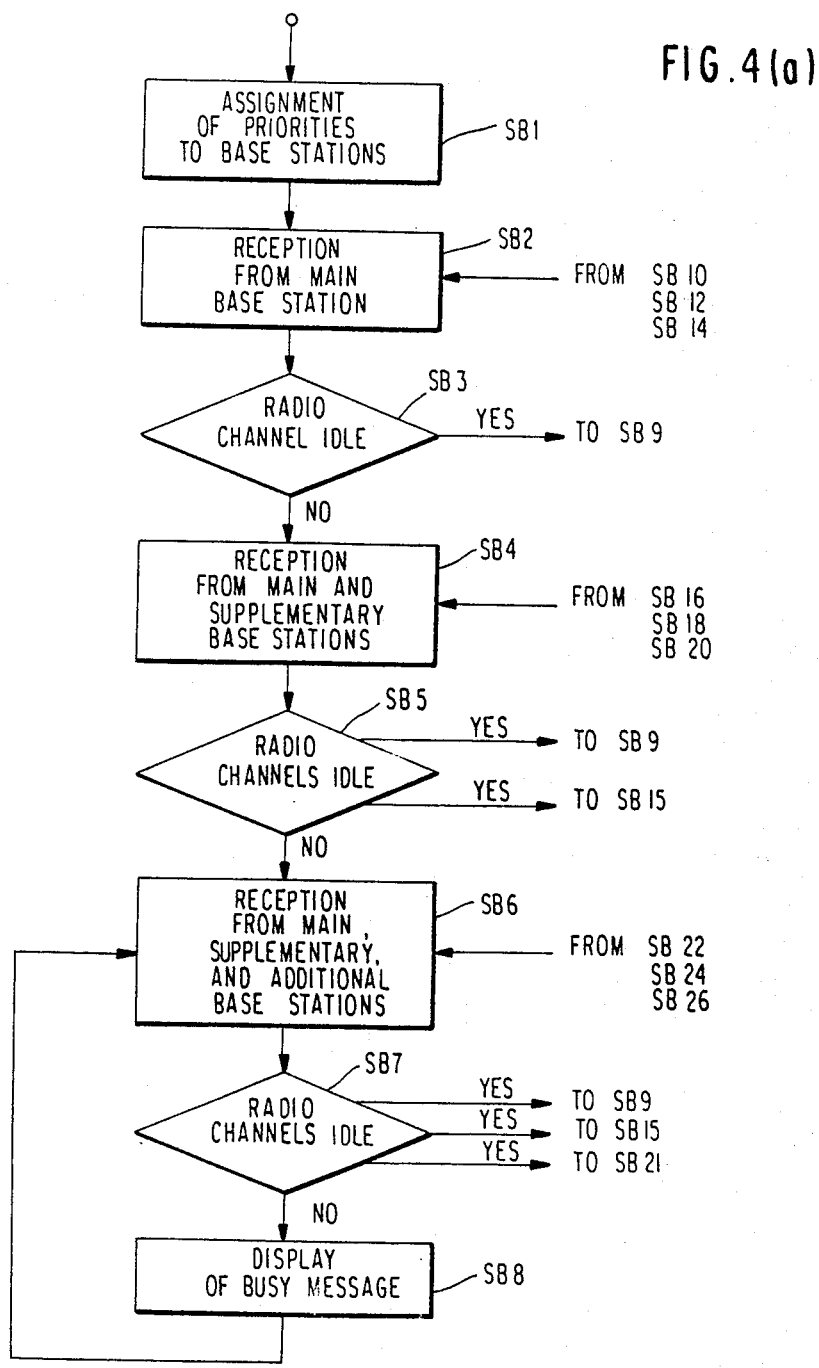
FIGS. 4(*a*), (*b*), (*c*), and (*d*) are flow charts for use in describing operation of the terminal station illustrated in FIG. 1.

Referring to FIGS. 4(a), (b), (c), and (d) together with FIGS. 1 and 2, description will be directed to operation of the terminal station 14. At a first stage SB1, the terminal station 14 assigns priorities to the respective base stations 11 through 13 in the manner which is described earlier in detail. The first stage SB1 proceeds to a second stage SB2 at which the monitoring circuit 37 monitors the channel status signal received from the main base station. When the radio channel of the main base station is idle, an internal signal is produced from the monitoring circuit 37 as the second result signal.

The second stage SB2 proceeds to a third stage SB3 at which judgement is made with reference to the internal signal whether or not the radio channel of the main base station is idle. When the radio channel is busy, the third stage SB3 is followed by a fourth stage SB4. At the fourth stage SB4, the monitoring circuit 37 is controlled by the control circuit 29 so as to alternately monitor the channel status signals received from the main and the supplementary base stations. When the internal signal is absent, the control circuit 29 alternately selects the first and the second monitoring arrangements and may therefore be referred to as an alternately selecting arrangement.

The fourth stage SB4 proceeds to a fifth stage SB5 at which judgement is made whether or not the radio channels of the main and the supplementary base stations are idle. When the radio channels are busy, the fifth stage SB5 is followed by a sixth stage SB6. At the sixth stage SB6, the monitoring circuit 37 is controlled by the control circuit 29 so as to cyclically monitor the channel station signals received from the main, the supplementary, and the additional base stations. When the monitoring circuit 37 monitors the channel status signal received from the additional base station, it may be referred to as a third monitoring arrangement.

The sixth stage SB6 proceeds to a seventh stage SB7 at which judgement is made whether or not the radio channels of the main, the supplementary, and the additional base stations are idle. When the radio channels are busy, the seventh stage SB7 is followed by an eighth stage SB8. At the eighth stage SB8, a busy message is displayed on a display (not shown) of the terminal station 14 to represent that the radio channels of the main, the supplementary, and the additional base stations are all busy. After displaying the busy message, the eighth stage SB8 returns back to the sixth stage SB6.

Returning to the third stage SB3, the description will proceed to a case where the radio channel of the main base station is found idle at the third stage SB3. The third stage SB3 is followed by a ninth stage SB9 at which judgement is made whether or not the terminal station 14 receives a calling signal from the main base station. The calling signal is for calling the subscriber of the terminal station 14 and is received through the control channel. When the calling signal is not received by the terminal station 14, the ninth stage SB9 is followed by a tenth stage SB10. Otherwise, the ninth stage SB9 is followed by an eleventh stage SB11 at which a predetermined receiving processing is carried out in response to the calling signal for enabling communication with the main base station in the manner known in the art. The eleventh stage SB11 proceeds to a twelfth stage SB12 at which the terminal station 14 communicates with the main base station. When the communication comes to an end, the twelfth stage SB12 returns back to the second stage SB2.

At the tenth stage SB10, judgement is made whether or not communication is requested by the subscriber of the terminal station 14 with another subscriber. When the communication is not requested, the tenth stage SB10 returns back to the second stage SB2. Otherwise, the tenth stage SB10 is followed by a thirteenth stage SB13 at which a predetermined transmitting processing is carried out for enabling communication with the main base station in the manner known in the art. The thirteenth stage SB13 proceeds to a fourteenth stage SB14 at which the terminal station 14 communicates with the main base station. When the communication comes to an end, the fourteenth stage SB14 returns back to the second stage SB2.

As will be understood from the above-mentioned description, the control circuit 29 is responsive to the internal signal and is for inhibiting operation of the second monitoring arrangement while the radio channel of the main base station is idle. Therefore, the control circuit 29 may be referred to herein as an inhibiting arrangement.

Figure 4B:
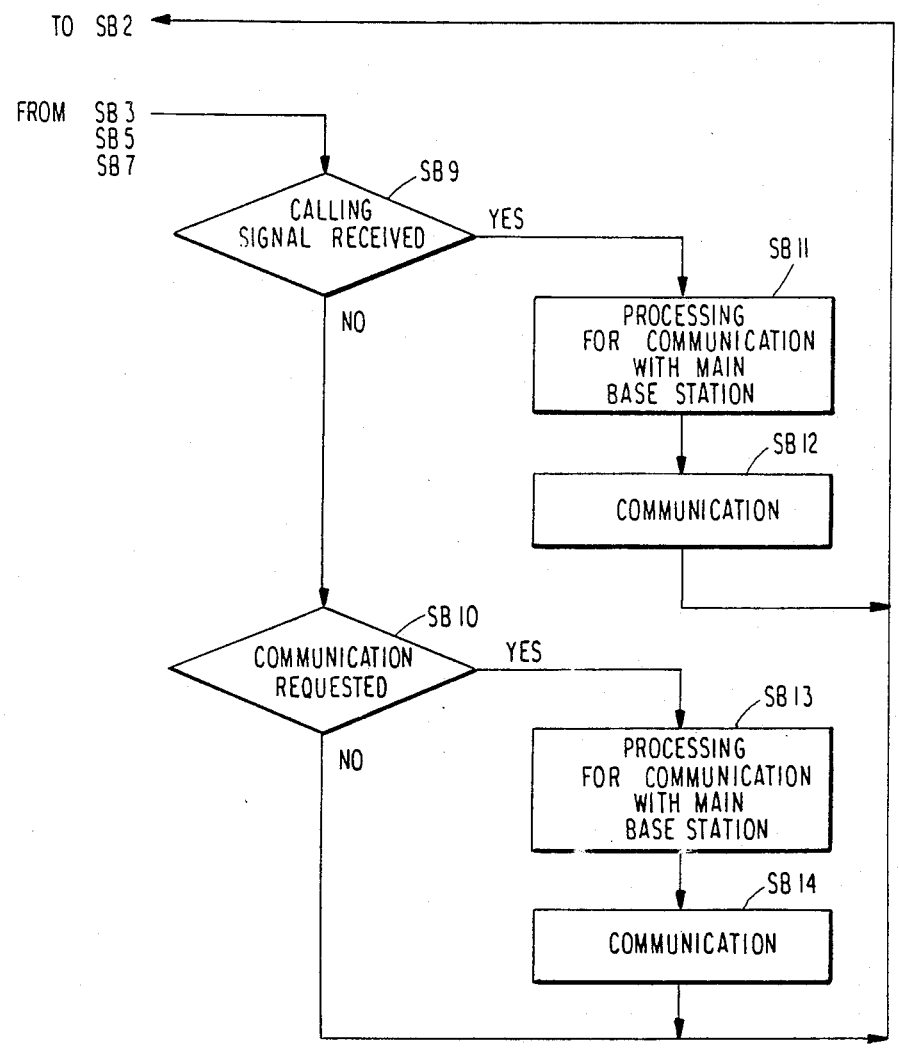
Figure 4:
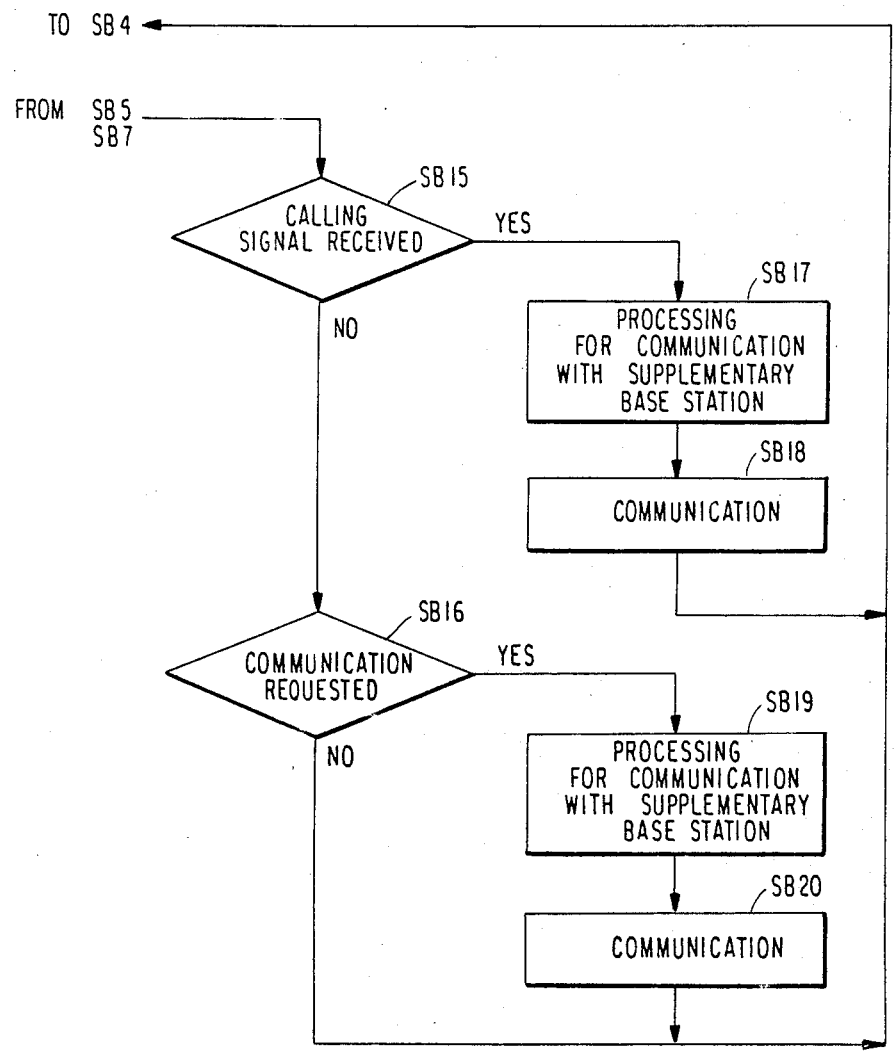
Figure 4D:
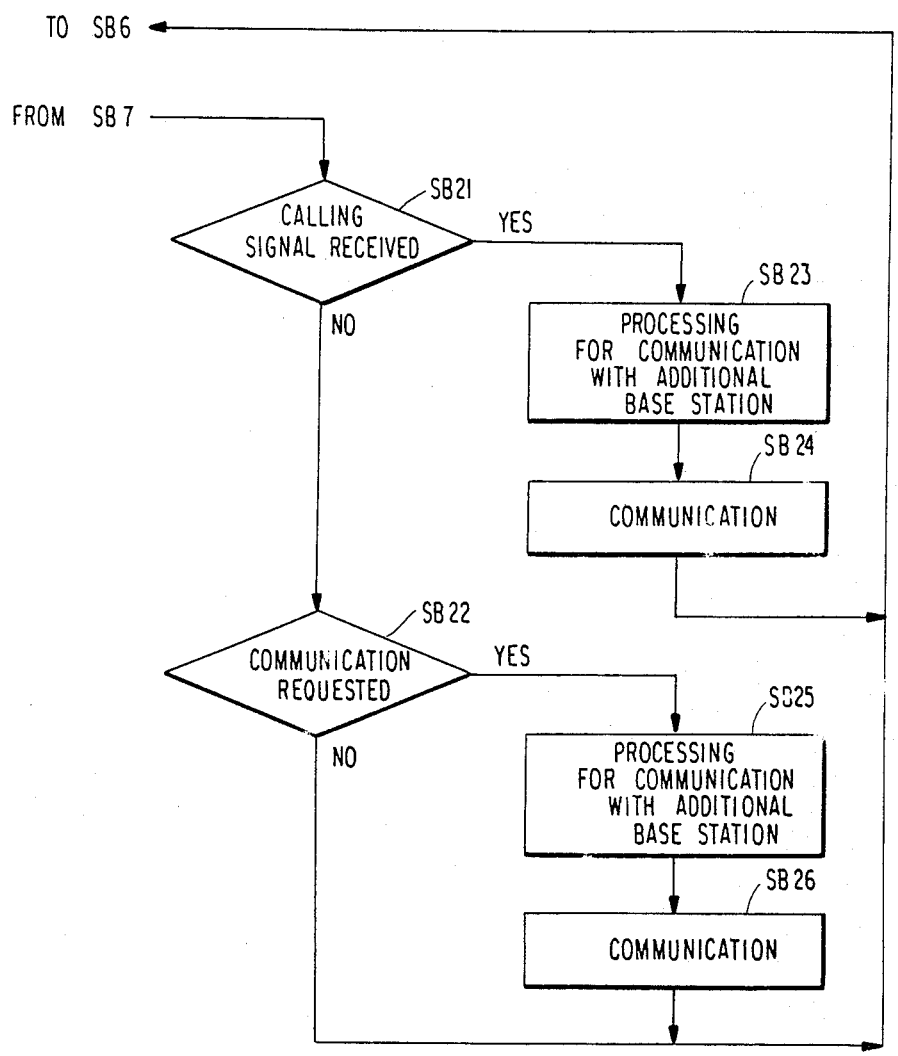

The description will now proceed to another case where the radio channel of the main base station is found idle at the fifth stage SB5. The fifth stage SB5 is followed by the ninth stage SB9 as described with reference to FIG. 4(b). Otherwise, judgement is made whether or not the radio channel of the supplementary base station is idle. When the radio channel of the supplementary base station is idle, the fifth stage SB5 is followed by a fifteenth stage SB15. Otherwise, the fifth stage SB5 is followed by the sixth stage SB6 as will be clear from the above-mentioned description.

At the fifteenth stage SB15, judgement is made whether or not the terminal station 14 receives a calling signal for the terminal station 14 from the supplementary base station. When the calling signal is not received by the terminal station 14, the fifteenth stage SB15 is followed by a sixteenth stage SB16. Otherwise, the fifteenth stage SB15 is followed by a seventeenth stage SB17 at which a predetermined receiving processing is carried out in response to the calling signal for enabling communication with the supplementary base station in the manner known in the art. The seventeenth stage SB17 proceeds to a eighteenth stage SB18 at which the terminal station 14 communicates with the supplementary base station. When the communication comes to an end, the nineteenth stage SB19 returns back to the fourth stage SB4.

At the sixteenth stage SB16, judgement is made whether or not communication is requested by the subscriber of the terminal station 14 with another subscriber. When the communication is not requested, the sixteenth stage SB16 returns back to the fourth stage SB4. Otherwise, the sixteenth stage SB16 is followed by a nineteenth stage SB19 at which a predetermined transmitting processing is carried out for enabling communication with the supplementary base station in the manner known in the art. The nineteenth stage SB19 proceeds to a twentieth stage SB20 at which the terminal station 14 communicates with the supplementary base station. When the communication comes to an end, the twentieth stage SB20 returns back to the fourth stage SB4.

The description will proceed to a case where the radio channel of the main base station is found idle at the seventh stage SB7. The seventh stage SB7 is followed by the ninth stage SB9. Otherwise, judgement is made whether or not the radio channel of the supplementary base station is idle. When the radio channel of the supplementary base station is idle, the seventh stage SB7 is followed by the fifteenth stage SB15. Otherwise, judgement is made whether or not the radio channel of the additional base station is idle. When the radio channel of the additional base station is idle, the seventh stage SB7 is followed by a twenty-first stage SB21. Otherwise, the seventh stage SB7 is followed by the eighth stage SB8 as will be clear from the above-mentioned description. At the twenty-first stage SB21, judgement is made whether or not the terminal station 14 receives a calling signal for calling the terminal station 14 from the additional base station. When the calling signal is not received by the terminal station 14, the twenty-first stage SB21 is followed by a twenty-second stage SB22. Otherwise, the twenty-first stage SB21 is followed by a twenty-third stage SB23 at which a predetermined receiving processing is carried out in response to the calling signal for enabling communication with the additional base station in the manner known in the art. The twenty-third stage SB23 proceeds to a twenty-fourth stage SB24 at which the terminal station 14 communicates with the additional base station. When the communication comes to an end, the twenty-fourth stage SB24 returns back to the sixth stage SB6.

At the twenty-second stage SB22, judgement is made whether or not communication is requested by the subscriber of the terminal station 14 with another subscriber. When the communication is not requested, the twenty-second stage SB22 returns back to the sixth stage SB6. Otherwise, the twenty-second stage SB22 is followed by a twenty-fifth stage SB25 at which a predetermined transmitting processing is carried out for enabling communication with the additional base station in the manner known in the art. The twenty-fifth stage SB25 proceeds to a twenty-sixth stage SB26 at which the terminal station 14 communicates with the additional base station. When the communication comes to an end, the twenty-sixth stage SB26 returns back to the sixth stage SB6.

Figure 5:
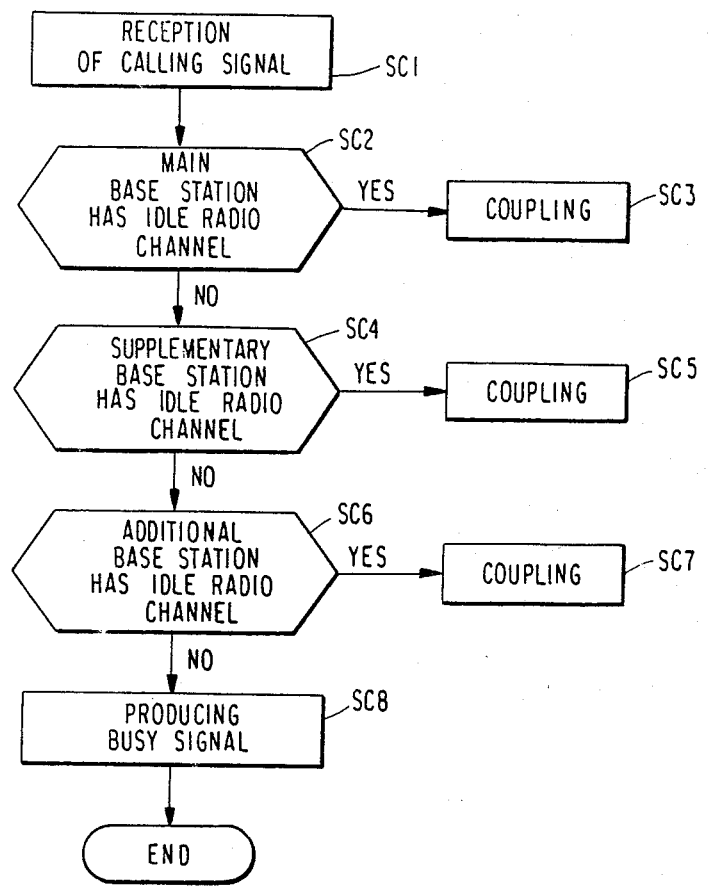
FIG. 5 is a flow chart for use in describing operation of the exchange illustrated in FIG. 1.

Referring to FIG. 5 together with FIG. 1, description will be made as regards to operation of the telephone exchange 16. At a first stage SC1, a calling signal is received by the telephone exchange 16 either through the line wires 21 or one of the base stations 11 through 13 for communication with the terminal station 14. The first stage SC1 proceeds to a second stage SC2 at which judgement is made with reference to the identification number and the priority instruction of the memory 22 about whether or not the radio channel of the main base station is idle. When the radio channel is idle, the second stage SC2 is followed by a third stage SC3 at which the telephone exchange 16 is coupled to the terminal station 14 through the main base station. Otherwise, the second stage SC2 is followed by a fourth stage SC4.

At the fourth stage SC4, judgement is made with reference to the identification number and the priority instruction of the memory 22 about whether or not the radio channel of the supplementary base station is idle. When the radio channel is idle, the fourth stage SC4 is followed by a fifth stage SC5 at which the telephone exchange 16 is coupled to the terminal station 14 through the supplementary base station. Otherwise, the fourth stage SC4 is followed by a sixth stage SC6.

At the sixth stage SC6, judgement is made with reference to the identification number and the priority instruction of the memory 22 whether or not the radio channel of the additional base station is idle. When the radio channel is idle, the sixth stage SC6 is followed by a seventh stage SC7 at which the telephone exchange 16 is coupled to the terminal station 14 through the additional base station. Otherwise, the seventh stage SC7 followed by an eighth stage SC8.

At the eighth stage SC8, the telephone exchange 16 produces a busy signal which represents that the radio channels of the main, the supplementary, and the additional base stations are all busy. The busy signal is sent through the line wires 21. After sending the busy signal, the operation of the telephone exchange 16 comes to a reset.

While the present invention has far been described in connection with the cordless telephone system, it will now readily possible for one skilled in the art to apply this invention to a radio communication network of the other kind including a plurality of base stations which have service areas partially overlapping on one another. The base stations may be either two in number or more than three. Each of the base stations may has a plurality of radio channels as is well known in the art. The priority instruction may be produced by another unit which is different from the terminal station. The memory 22 may be situated in each of the base stations for memorizing the priority instruction and the identification number. It is a matter of course that the radio channels may be on one of a frequency division and a time-sharing basis.

What is claimed is:

1. A terminal station of a radio communication network for use in a common service area of a plurality of radio base stations comprising a main base station and a supplementary base station having a lower priority for said terminal station than said main base station, each base station being preassigned with a radio channel and for transmitting a channel status signal representative of whether said radio channel is idle or busy, wherein the improvement comprises:

first monitoring means for monitoring the channel status signal of said main base station to produce an internal signal when the radio channel of said main base station is idle;

second monitoring means for monitoring the channel status signal of said supplementary base station; and inhibiting means coupled to said first and said second monitoring means and responsive to said internal signal for inhibiting operation of said second monitoring means while the radio channel of said main base station is idle.

2. A terminal station as claimed in claim 1, said radio communication network further comprising an exchange coupled to said main and said supplementary base stations, said exchange including memory means for memorizing a priority instruction, and selecting means coupled to said memory means for selecting one of said main and said supplementary base stations at a time with reference to said priority instruction, said terminal stations further comprising:

producing means for producing said priority instruction; and supplying means coupled to said producing means for supplying said priority instruction to said memory means through said selected base station.

3. A terminal station as claimed in claim 2, said producing means comprising:

determining means for determining a priority concerning said main and said supplementary base stations; and local producing means coupled to said determining means for producing said priority instruction with reference to said priority.

4. A terminal station as claimed in claim 3, further comprising:

first detecting means coupled to said first monitoring means for detecting a first degree of intensity of the channel status signal of said main base station; and second detecting means coupled to said second monitoring means for detecting a second degree of intensity of the channel status signal of said supplementary base station, said determining means being for determining said priority with reference to said first and said second degrees of the intensity.

5. A terminal station as claimed in claim 1, further comprising alternately selecting means coupled to said first and said second monitoring means and responsive to the absence of said internal signal for alternately selecting said first and said second monitoring means while said main radio channel is busy.

6. A terminal station as claimed in claim 1, said radio base stations further comprising an additional base station having a lower priority than said supplementary base station for said terminal station, wherein:
   said second monitoring means produces an additional signal when the radio channel of said supplementary base station is idle;
   said terminal station further comprising:
   third monitoring means for monitoring the additional channel status signal of said additional base station; and
   additional inhibiting means coupled to said second and said third monitoring means and responsive to said internal and said additional signals for inhibiting operation of said third monitoring means while the radio channel of at least one of said main and said supplementary base stations is idle.

7. In a terminal station for use in a radio communication network including a plurality of base stations which have service areas partially overlapping one another and to which different radio channels are preassigned for communication in the respective service areas, said base stations being for broadcasting channel status signals representative of whether the respective radio channels are idle or busy, the improvement wherein:
   said terminal station is communicable with first and second ones of said base stations that have, in relation to said terminal station, a predetermined degree of priority and a lesser degree of priority lower than said predetermined degree, respectively, and that have first and second ones of said radio channels, respectively;
   said terminal station comprising:
   idle channel monitoring means for monitoring the channel status signals of said first and said second radio channels to detect whether or not each of said first and said second radio channels is idle; and
   selecting means coupled to said idle channel monitoring means for selecting either of said first and said second radio channels with reference to said predetermined and said lesser degrees of priority when at least one of said first and said second radio channels is idle.

* * * * *